Patented May 24, 1949

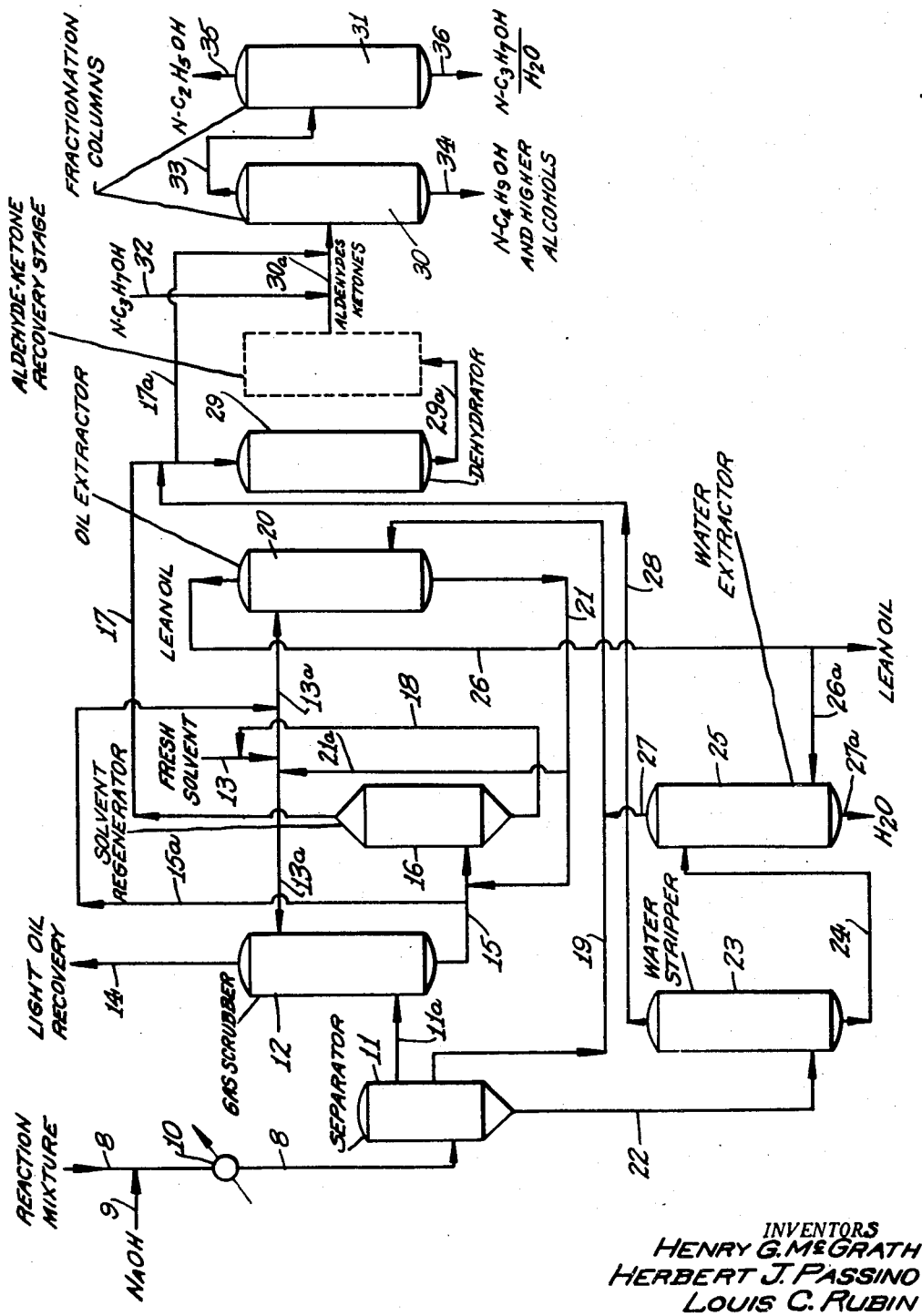

2,470,782

UNITED STATES PATENT OFFICE 2,470,782

SEPARATION OF ORGANIC COMPOUNDS

Henry G. McGrath, Elizabeth, Herbert J. Passino, Englewood, and Louis C. Rubin, West Caldwell, N. J., assignors to The M. W. Kellogg Company, Jersey City, N. J., a corporation of Delaware Application November 14, 1946, Serial No. 709,871

15 Claims. (Cl. 260—450)

This invention relates to the separation of organic compounds and relates more particularly to the separation of oxygenated organic compounds from the reaction product obtained in the hydrogenation of carbon monoxide. Still more particularly, the invention relates to an improved process for effecting such separation by means of a polar solvent, as more fully hereinafter set forth and as claimed.

Difficulty is encountered where separation of oxygenated organic compounds is attempted from the reaction product obtained from the reduction of carbon monoxide with hydrogen in the presence of a catalyst such as iron, nickel or cobalt. These oxygenated compounds comprising complex mixtures of aldehydes, ketones, alcohols, esters and acids, may entail the use of several solvents to effect complete separation of such compounds from the reaction product obtained in the aforementioned reduction process.

It is an object of this invention to effect efficient and economic separation of such oxygenated compounds by solvent extraction. Another object of this invention is to separate pure oxygenated organic compounds in an anhydrous state by selective separation from the reaction product obtained in the hydrogenation of carbon monoxide. Other objects and advantages of the invention will be apparent during the course of the following more detailed disclosure.

We have found that the use of a selective polar solvent of the glycol type in accordance with the present process, in addition to its desirability as a single selective solvent, has the added advantage of permitting economic and efficient separation of oxygenated organic compounds from the reaction product obtained in the catalytic hydrogenation of carbon monoxide. Such solvent may be an aqueous or anhydrous glycol. While we prefer to use ethylene glycol as an overall generally suitable solvent in accordance with the present process, it should be noted that our invention is not limited solely to its use. Other glycol solvents may be successfully employed, such as diethylene glycol, isopropylene glycol, triethylene glycol, trimethylene glycol and the like.

The accompanying drawing illustrates diagrammatically one form of the apparatus employed and capable of carrying out the process of our invention. The invention will be described in detail by reference to a process employing the apparatus illustrated in the drawing, but it should be noted that it is not intended that the invention be limited to the embodiment as illustrated but is capable of other embodiments which may extend beyond the scope of the apparatus illustrated in the drawing. Furthermore, the distribution and circulation of the liquids and vapors is illustrated in the drawing by diagrammatic representation of the apparatus employed. The valves, pumps, compressors and other mechanical elements necessary to effect the transfer of liquids and vapors and to maintain the conditions of temperature and pressure necessary to carry out the function of the apparatus are omitted, in order to simplify the description. It will be understood, however, that much equipment of this nature is necessary and will be supplied by those skilled in the art.

Referring to the drawing, the product of the reaction of carbon monoxide and hydrogen is supplied through line 8. This product is in vapor form substantially as it comes from the reactor at temperatures varying between approximately 300° F. to 700° F. Where it is so desired, the product may be first neutralized with an alkali such as aqueous sodium hydroxide in order to convert organic acids present into their corresponding salts and to saponify esters, thus effecting separation between organic acids and other oxygenated organic compounds for subsequent acid recovery. Alkali thus employed may be introduced through line 9.

The reaction product in line 8 is next cooled to condense substantially all normally liquid components. Conveniently, condensation may be effected by transferring the product in line 8 to a condenser 10 with which line 8 connects. In condenser 10, the product is cooled to a temperature sufficient to obtain a mixture of a condensate and uncondensed gas. The mixture thus obtained in condenser 10 is transferred through line 8 into a separator 11. In separator 11 the gases are withdrawn through line 11a and the condensate separates as a lower aqueous phase and an upper oil phase. The aqueous phase is withdrawn from the bottom of separator 11 through line 22 for further treatment to be hereinafter described. The oil phase is drawn off as a side stream at an intermediate point in separator 11 through line 19.

The gases separated in separator 11 are passed through line 11a to a low point in a suitable scrubbing vessel 12. In this gas scrubber the gases are intimately contacted with a selective polar solvent treating agent, such as ethylene glycol, introduced through line 13a in order to remove the more volatile oxygenated compounds by countercurrent absorption in the solvent. The remaining gas, essentially free of oxygenated compounds and consisting essentially of light hydrocarbons, is withdrawn overhead through line 14 to a light oil recovery system for further treatment or use outside the scope of the present process. Bottoms from gas scrubber 12, comprising fat solvent containing oxygenated compounds, are withdrawn through line 15.

The fat solvent obtained as bottoms from gas scrubber 12 is transferred through line 15 into a solvent regenerator 16. In solvent regenerator 16 the fat solvent is heated under conditions effective to distill overhead a solvent-free raffinate containing oxygenated compounds which are withdrawn through line 17. Bottoms from solvent regenerator 16 comprising recovered solvent are withdrawn through line 18. The solvent recovered as bottoms from solvent regenerator 16 are transferred through line 18 into line 13 for further use of the solvent treating agent in line 13a, with which line 13 connects. Make-up treating agent is also supplied through line 13. The solvent-free raffinate from solvent regenerator 16, containing oxygenated organic compounds, is transferred through line 17 for further treatment in the process to be hereinafter described.

The oil phase obtained as a side stream from separator 11 is transferred through line 19 into an extraction tower 20. In tower 20, oxygenated compounds contained in the oil phase are subjected to liquid-liquid solvent extraction by contact with quantities of the selective solvent treating agent introduced into tower 20 through line 13a, under conditions effective to absorb in the treating agent the oxygenated compounds contained in the oil stream passing through line 19. The extract from tower 20, comprising the fat solvent containing oxygenated compounds, is withdrawn through line 21. The raffinate from tower 20, comprising lean oil, is withdrawn overhead through line 26 for further use or treatment outside the scope of this process.

It should be noted that it is possible to subject the aforementioned oil phase, obtained from separator 11 through line 19, to simple fractionation after leaving separator 11. Such fractionation resulting in the obtaining of different oil fractions, may be of value in facilitating solvent extraction in instances where it is desirable to employ solvents of varying water content. The selection of such solvents will depend upon the properties of the oxygenated chemicals undergoing separation.

As described above, bottoms from gas scrubber 12 comprising fat solvent containing oxygenated organic compounds are withdrawn through line 15. It is also possible, therefore, to transfer into line 15a a portion of the fat solvent thus obtained to combine with quantities of fresh solvent entering tower 20 through line 13a with which line 15a connects. Such a step effects the addition of small quantities of water to the solvent and results in obtaining greater selectivity in the separation of oxygenated compounds such as alcohols. In addition, it is also possible to pass a portion of the aforementioned fat solvent through line 15a to combine with quantities of fresh solvent entering scrubber 12 through line 13a, with which line 15a connects. Such a step effects dehydration of the separated gas stream entering scrubber 12 through line 11a, by contacting the gas in scrubber 12 with the combined solvent thus obtained through line 13a.

The extract from tower 20 comprising the fat solvent containing oxygenated organic compounds is transferred through line 21 into line 15. In line 15 the fat solvent from line 21 is combined with the fat solvent obtained as bottoms from gas scrubber 12. The combined mixture of fat solvent thus obtained is passed into solvent regenerator 16 through line 15 for further use in the process described above. It is also possible to pass a portion of the extract from tower 20, comprising the fat solvent withdrawn through line 21, into line 21a to combine with the quantities of fresh solvent present in line 13a with which line 21a connects. This step may be particularly desirable, inasmuch as the chemical content of the solvent is increased prior to stripping. Where this is accomplished, proportionately smaller quantities of fresh solvent will be required.

The aqueous phase withdrawn as bottoms from separator 11 in the process described above, is transferred through line 22 to a low point in a distillation tower 23. Tower 23 functions as a water stripper and is heated under conditions effective to separate the aqueous phase into a high boiling and a low boiling fraction. The high boiling fraction is withdrawn as bottoms from tower 23 through line 24. The low boiling fraction is withdrawn overhead from tower 23 through line 28. The latter fraction, taken as overheads from tower 23, contains low boiling oxygenated compounds comprising substantially all of the alcohols present, water-free. It is possible at this point to obtain a cut as low as the ethyl alcohol-water constant boiling mixture or as high as the amyl or hexyl alcohol-water azeotropes. The overheads thus obtained from tower 23 are transferred through line 28 for further treatment in the process hereinafter described.

The high boiling fraction obtained as bottoms from tower 23 through line 24 contains an aqueous mixture of organic acids present and proportionately smaller quantities of aldehydes and ketones. This fraction is next transferred from tower 23 through line 24 to an upper point in an extraction tower 25. In tower 25, oxygenated compounds contained in the high boiling fraction, are subjected to countercurrent liquid-liquid extraction with a portion of the lean oil withdrawn from line 26 and which is introduced into tower 25 through line 26a. Tower 25 is operated under conditions effective to absorb in the lean oil all higher boiling oxygenated compounds present. These compounds will comprise $C_4$ and higher alcohols and are withdrawn as fat oil overheads from tower 25 through line 27. Water obtained as bottoms from tower 25 is withdrawn through line 27a. The overheads from tower 25, comprising the fat oil containing $C_4$ and higher alcohols, are transferred through line 27 into line 19 with which line 27 connects. In line 19 the oxygenated compounds thus introduced through line 27 are combined with the oxygenated compounds contained in the oil phase withdrawn from separator 11 through line 19. The stream thus combined is transferred to tower 20 for solvent extraction treatment in the process hereinbefore described.

As described above, neutralization of the reaction product of carbon monoxide and hydrogen may be effected in order to convert organic acids present into their corresponding organic salts. Where such is the case, water withdrawn as bottoms from tower 25 through line 27a will also contain these salts. These salts may be subjected to further treatment outside the scope of this process in order to effect separation of their corresponding organic acids. However, it should be noted that in certain instances it may not be desirable to effect previous neutralization of the reaction mixture, inasmuch as the presence of large quantities of organic acids will require proportionately large quantities of alkali necessary to effect neutralization. This would necessitate employing large quantities of mineral acids to effect regeneration of organic acids. Such organic acids may be separated nevertheless, by a combination of distillation, extraction and neutralization of higher molecular weight oil soluble organic acids. It may also be desirable, in instances where an alkali is not utilized to remove acids present, to process the acid extract separately rather than to combine it with the oxygenated chemicals distilled from the water in tower 23.

As indicated above, the overheads from tower 23 contain substantially all of the alcohols present in the aqueous phase withdrawn as bottoms from separator 11. These overheads are transferred through line 28 into line 17. Line 17, as indicated above, will contain the solvent-free raffinate from solvent regenerator 16 comprising oxygenated organic compounds and will contain proportionately smaller quantities of aldehydes and ketones. It is possible at this stage to separate, by conventional methods of distillation, such low molecular weight oxygenated compounds as acetaldehyde, acetone, methyl ethyl ketone and methanol from the total aqueous stream of oxygenated compounds in line 17.

The total aqueous stream of oxygenated compounds in line 17 is next transferred into a dehydration tower 29 to obtain complete dehydration of remaining higher molecular weight aldehydes and ketones present in line 17. Solid salts or solutions thereof, such as magnesium sulfate or lithium chloride, may be employed in this operation although dehydration is not limited to these salts alone. At times it may also prove advisable to use a saturated salt solution such as lithium chloride solution to effect desired dehydration. When solid magnesium sulfate is used, it is possible to carry out regeneration periodically with hot flue gas. Where it is desirable to use saturated brine solutions, regeneration may be carried out by the evaporation of water present.

After dehydration of higher molecular weight aldehydes and ketones in tower 29, the dehydrated stream of aldehydes, ketones and alcohols is transferred from tower 29 through line 29a into an aldehyde-ketone recovery stage. The separation of aldehydes and ketones from alcohols present may be effected by any of the following methods; for example, such separation can be accomplished by the formation of a sodium bisulfite addition compound. The resulting material can be decomposed by a combination of temperature plus vacuum so that bisulfite decomposition, which results in the formation of a corrosive gas, such as sulfur dioxide, may be minimized.

Sodium bisulfite forms addition complexes with aldehydes and methyl ketones. Inasmuch as most ketones present in this process are methyl ketones, sodium bisulfite will, therefore, substantially effect complete separation of aldehydes and ketones from solutions thereof.

Another method for removal of aldehydes and ketones may be effected by the alkalization of such compounds with solid sodium hydroxide. This may be considered as an aldol condensation, being in effect an addition reaction.

Aldehydes and ketones may also be converted to alcohols by hydrogenation. This may be accomplished by the reduction of aldehydes or ketones in acid solution or by catalytic hydrogenation using such catalysts as copper, silver or nickel. Aldehydes and ketones may also be converted to acids by oxidation.

A still further method of separating aldehydes and ketones from alcohols may be effected by acidification to bring about aldehyde polymerization; the aldehydes being very susceptible to polymerization, the ketones being attacked less readily. This step may then be followed by fractionation to effect separation between aldehyde polymers and ketones.

Following the above described aldehyde and ketone removal stage, remaining alcohols may be transferred through line 30a into a series of fractionation towers 30 and 31. Towers 30 and 31 are heated under conditions effective in the obtaining of pure cuts of alcohols having two or more carbon atoms per molecule. It should be noted that more fractionation towers than are shown in the drawing may be advantageously employed, depending upon the required purity of the alcohols to be recovered.

It should also be noted that where acetone, acetaldehyde, methanol and methyl ethyl ketone have not been separated prior to dehydration in tower 29, these oxygenated compounds may also be transferred through line 30a into towers 30 and 31. Towers 30 and 31 may be then heated under conditions effective in the obtaining of pure acetone, acetaldehyde, methanol and methyl ethyl ketone. The recovery of such oxygenated compounds in a pure state may be effected in all instances, regardless of the method previously employed for the removal of the higher molecular weight aldehydes and ketones, provided the method adopted is not one such as hydrogenation which will convert aldehydes and ketones into alcohols.

It is also possible that either the aforementioned dehydration step or aldehyde-ketone recovery stage, or both, may be eliminated where so desired. This may be effected by transferring the total stream of oxygenated organic compounds in line 17 through line 17a and into towers 30 and 31 for further treatment in accordance with the process described above.

Although substantial dehydration is effected when the total stream of oxygenated organic compounds in line 17 is passed into tower 29, nevertheless some water is invariably found among remaining alcohols present, following the aldehyde-ketone recovery stage. In order to effect the removal of such water, we have included as part of our invention a method for the dehydration of remaining alcohols by the addition of a light alcohol, such as normal propyl alcohol, which will form a constant boiling mixture with water. This is effected by the addition of normal propyl alcohol introduced through line 32 into the stream of such remaining alcohols in line 30a with which line 32 connects. The mixture of alcohols and water is then charged through line 30a to fractionation tower 30. Tower 30 is heated under conditions effective to distill overhead compounds having a lower boiling point than the propyl alcohol-water constant boiling mixture, which are taken overhead through line 33. An anhydrous mixture of butyl and higher alcohols are withdrawn as bottoms from tower 30, through line 34. The overheads obtained from the primary fractionation in tower 30 are transferred through line 33 into the second fractionation tower 31. Tower 31 is heated under conditions effective to distill overhead alcohols having two carbon atoms per molecule, which are withdrawn through line 35. Bottoms from tower 31 comprising the propyl alcohol-water constant boiling mixture are withdrawn through line 36. The propyl alcohol-water constant boiling mixture withdrawn from tower 31 through line 36, may next be dehydrated by ternary distillation with benzene or in any suitable manner known to those skilled in the art. We prefer to use normal propyl alcohol to effect the above described dehydration because anhydrous higher boiling alcohols are thus obtained directly upon subsequent distillation, making possible the removal of water from such alcohols in this manner. However, it should be noted that our invention is not limited solely to the use of normal propyl alcohol for the purpose shown. Other lower or higher boiling alcohols may be used depending upon the characteristics of the mixture undergoing treatment.

To recapitulate, our invention is directed to a process for the separation of oxygenated organic compounds present in the reactor gas obtained from the hydrogenation of carbon monoxide in the presence of a catalyst, where such compounds may include mixtures of aldehydes, ketones, alcohols, esters and acids. However, while the invention has a particular applicability to the separation of such compounds from the source indicated, the process of the invention is not necessarily restricted to effect the desired separation of these compounds as derived from the aforementioned source. The process of the invention may be also successfully applied to the separation of any mixtures of the aforementioned compounds, without regard to the source from which these mixtures may have been derived and without regard to the composition of such mixtures.

In addition, while we have described a particular embodiment of our invention for purposes of illustration, it should be understood that variations, modifications and adaptations thereof, which will be obvious to one skilled in the art, may be made within the spirit of the invention as set forth in the appended claims.

We claim:

1. A process for treating the reaction product obtained in the hydrogenation of carbon monoxide wherein said product contains hydrocarbons and oxygenated organic compounds comprising aldehydes, ketones, alcohols, acids, and esters which comprises cooling said product to obtain an uncondensed gas phase and a condensate comprising an oil phase and a water phase wherein each of said phases contains at least a portion of said hydrocarbons and at least a portion of said oxygenated compounds, separating the oil phase and the water phase, separately subjecting the oil phase to extraction with a solvent for oxygenated compounds to obtain an extract containing oxygenated compounds substantially hydrocarbon-free and a lean oil raffinate, separately subjecting the water phase obtained in the first-mentioned cooling step to distillation to separate said water phase into a high-boiling fraction comprising an aqueous mixture of organic acids, esters, aldehydes, ketones, and alcohols having at least four carbon atoms per molecule and a low-boiling fraction comprising alcohols having up to three carbon atoms per molecule, subjecting said last-mentioned high-boiling fraction to extraction treatment with a portion of said lean oil raffinate to obtain an extract containing alcohols having at least four carbon atoms per molecule and a water raffinate, and passing said last-mentioned extract to said first-mentioned extraction treatment in combination with said first-mentioned oil phase.

2. The process of claim 1 wherein gas uncondensed in the first-mentioned cooling step is subjected to scrubbing treatment with the solvent employed in the first-mentioned extraction step, and the extracts from the scrubbing treatment and the extraction step are passed to a common solvent recovery step.

3. The process of claim 1 wherein the extract from the first-mentioned extraction step is passed to a solvent regeneration step to separate solvent from oxygenated compounds dissolved therein, the oxygenated compounds separated from solvent are combined with the distillate obtained from the distillation treatment of the first-mentioned water phase, and these combined products are subjected to dehydration.

4. The process of claim 1 wherein gas uncondensed in the first-mentioned cooling step is scrubbed with a portion of solvent employed in the first-mentioned extraction step, the extracts from the scrubbing step and the extraction step are passed to a common solvent regeneration step to separate solvent from oxygenated compounds dissolved therein, the oxygenated compounds separated from the solvent are combined with the distillate obtained from the distillation treatment of the first-mentioned water phase, and these combined products are subjected to dehydration.

5. The process of claim 1 wherein the reaction product, prior to the aforementioned cooling step is neutralized with an alkali to convert organic acids present in said reaction product into their corresponding salts and to saponify esters.

6. The process of claim 1 wherein gas uncondensed in the first-mentioned cooling step is subjected to scrubbing treatment with the solvent employed in the first-mentioned extraction step, and a portion of the extract from the scrubbing treatment is combined with further quantities of fresh solvent.

7. The process of claim 1 wherein a portion of the extract from the first-mentioned extraction step is combined with further quantities of fresh solvent.

8. The process of claim 1 in which said solvent is a polar solvent.

9. The process of claim 1 in which said solvent is a glycol.

10. The process of claim 1 in which said solvent is ethylene glycol.

11. The process of claim 1 wherein gas uncondensed in the first-mentioned cooling step is scrubbed with a portion of solvent employed in the first-mentioned extraction step, the extracts from the scrubbing step and the extraction step are passed to a common solvent regeneration step to separate solvent from oxygenated compounds dissolved therein, the oxygenated compounds separated from solvent are combined with the distillate obtained from the distillation treatment of the first-mentioned water phase, and light and heavy alcohols are separately recovered.

12. The process of claim 1 wherein gas uncondensed in the first-mentioned cooling step is scrubbed with a portion of solvent employed in the first-mentioned extraction step, the extracts from the scrubbing step and the extraction step are passed to a common solvent regeneration step to separate solvent from oxygenated compounds dissolved therein, the oxygenated compounds separated from solvent are combined with the distillate obtained from the distillation treatment of the first-mentioned water phase, the combined products are subjected to dehydration, aldehydes and ketones are separated from products obtained from said dehydration step, and remaining light and heavy alcohols are separately recovered.

13. The process of claim 1 wherein gas uncondensed in the first-mentioned cooling step is scrubbed with a portion of solvent employed in the first-mentioned extraction step, the extracts from the scrubbing step and the extraction step are passed to a common solvent regeneration step to separate solvent from oxygenated compounds dissolved therein, the oxygenated compounds separated from solvent are combined with the distillate obtained from the distillation treatment of the first-mentioned water phase, the combined products are subjected to dehydration, aldehydes and ketones are separated from products obtained from said dehydration step, and remaining alcohols are separately subjected to dehydration with a solvent.

14. The process of claim 1 wherein gas uncondensed in the first-mentioned cooling step is scrubbed with a portion of solvent employed in the first-mentioned extraction step, the extracts from the scrubbing step and the extraction step are passed to a common solvent regeneration step to separate solvent from oxygenated compounds dissolved therein, the oxygenated compounds separated from solvent are combined with the distillate obtained from the distillation treatment of the first-mentioned water phase, the combined products are subjected to dehydration, aldehydes and ketones are separated from products obtained from said dehydration step, and remaining alcohols are separately subjected to dehydration with a light alcohol.

15. The process of claim 1 wherein gas uncondensed in the first-mentioned cooling step is scrubbed with a portion of solvent employed in the first-mentioned extraction step, the extracts from the scrubbing step and the extraction step are passed to a common solvent regeneration step to separate solvent from oxygenated compounds dissolved therein, the oxygenated compounds separated from solvent are combined with the distillate obtained from the distillation treatment of the first-mentioned water phase, the combined products are subjected to dehydration, aldehydes and ketones are separated from products obtained from said dehydration step, and remaining alcohols are separately subjected to dehydration with propyl alcohol.

HENRY G. McGRATH.
HERBERT J. PASSINO.
LOUIS C. RUBIN.

REFERENCES CITED

The following references are of record in the file of this patent:

UNITED STATES PATENTS

| Number | Name | Date |
|---|---|---|
| 1,870,816 | Lewis | Aug. 9, 1932 |
| 2,002,533 | Frolich | May 28, 1935 |
| 2,083,125 | Scheuble | June 8, 1937 |
| 2,171,324 | Zetzesche et al. | Aug. 29, 1939 |
| 2,274,750 | Soenksen et al. | Mar. 3, 1942 |
| 2,305,236 | Bruson | Dec. 15, 1942 |
| 2,417,164 | Huber | Mar. 11, 1947 |

FOREIGN PATENTS

| Number | Country | Date |
|---|---|---|
| 350,502 | Great Britain | June 15, 1931 |